Feb. 7, 1939.   H. F. GEORGE   2,146,697
ANTITHEFT DEVICE
Filed Dec. 9, 1936
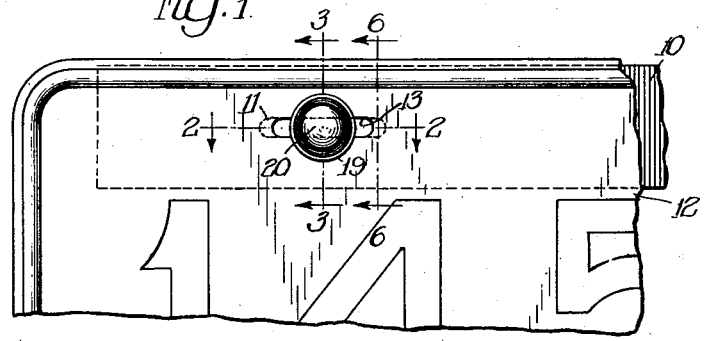
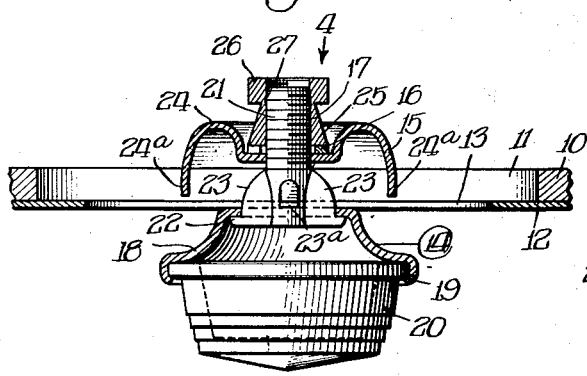
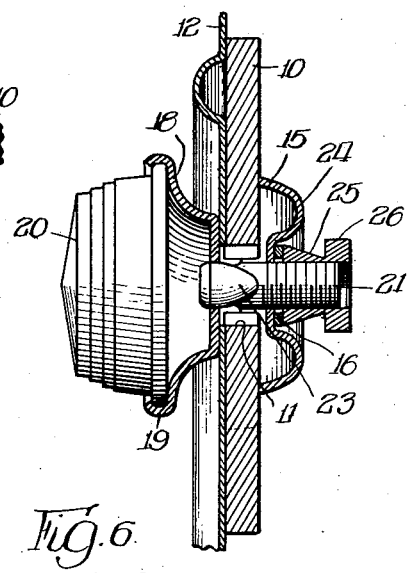
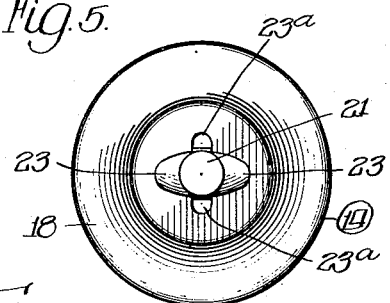
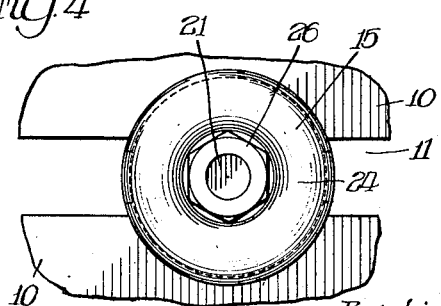
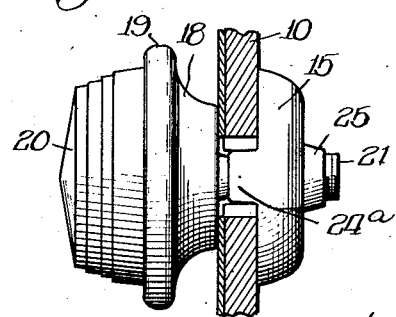
Inventor:
Harry F. George,

Patented Feb. 7, 1939

2,146,697

UNITED STATES PATENT OFFICE 2,146,697

ANTITHEFT DEVICE

Harry F. George, Chicago, Ill.

Application December 9, 1936, Serial No. 114,901

11 Claims. (Cl. 40—125)

The present invention relates to anti-theft devices.

The present invention will be described with reference to devices for holding automobile license plates upon their supporting brackets, although as the description proceeds it will be noted that the invention has a broader application.

An object of the present invention is to provide an anti-theft device which is simple and cheap to manufacture, simple to install and effective in operation.

A further object is to provide a theft preventing device which may be readily manufactured out of inexpensive materials, which will be presentable in appearance, and which will effectually foil the ordinary thief.

Another object is to provide a theft preventing device readily applicable to the holding of the ordinary automobile license plate upon the usual form of supporting bracket.

Further objects will appear as the description proceeds.

Referring to the drawing—

Figure 1 is a fragmentary view showing an automobile license plate supported on a bracket by means of one embodiment of the present invention;

Figure 2 is a sectional view on an enlarged scale taken along the plane indicated by the arrows 2—2 of Figure 1;

Figure 3 is a sectional view taken along the plane indicated by the arrows 3—3 of Figure 1;

Figure 4 is a fragmentary view taken in the direction of the arrow 4 of Figure 2;

Figure 5 is a view of the shank portion of the structure shown in Figures 1 to 4, the parts associated with said shank portion being omitted; and Figure 6 is a sectional view taken along the plane indicated by the arrows 6—6 of Figure 1.

The numeral 10 indicates a bracket such as commonly provided on motor cars for the reception of a license plate. Such brackets are ordinarily provided with a pair of aligned slots, one of which is shown in Figures 1 and 2 and indicated by the numeral 11. Disposed on said bracket 10 is a license plate 12. In most instances the license plate is provided with aligned slots 13 adapted to overlie the slots 11 of the bracket. In some instances the license plate is provided with round holes instead of elongated slots. As the description proceeds it will be clear that the present invention is applicable for use with license plates having either elongated slots, or round holes.

The theft preventing device forming the subject matter of the present invention includes the headed shank portion 14, the dished washer 15, the spring washer 16, and the nut 17. Referring first to the headed shank portion 14, it will be noted from the drawing that said portion includes a head 18 which may consist of a metal stamping of cupped formation, said metal stamping having the turned over annular edge portion 19 which, in cooperation with the remainder of said head, serves to grip an ornamental button 20. Said button 20 may be chosen of glass or similar material adapted to reflect light effectively whereby to serve as a warning signal when illuminated by the headlights of an approaching car. The headed shank portion 14 also includes the threaded shank 21. Said threaded shank 21 includes the head portion 22 adapted to seat within the cup shaped member 18.

Said shank 21 is provided with the diametrically opposed wings 23—23 extending therefrom, which wings 23—23 are adapted to be seated within the slot 13 of the license plate 12 and within the slot 11 of the bracket 10 with the shank 21 mounted in position as illustrated in Figure 2. Said wings 23—23 will prevent turning of the shank 21, execept through a very small angle. Said wings 23—23 taper away from the head portion 22 toward the threaded end of the shank 21, whereby said wings will dig into the metal of the license plate 12 in the event that said license plate has a round hole instead of a slot for receiving said shank 21. The shank 21 may be riveted to the cup shaped member 18 by means of the swedged out portions 23a—23a. It will be understood, of course, that the base portion of the cup shaped member 18 has a diameter sufficiently great to span the slot 13 of the license plate 12 and the slot 11 of the bracket 10.

The dished washer 15 is provided with an aperture of a size to loosely receive the shank 21. Said washer 15 is provided with the annular beaded portion 24 surrounding the shank 21 when said washer 15 is in operative position with respect to said shank 21. Said washer 15 is provided with the diametrically opposed fingers 24a—24a adapted to be seated within the slot 11 of the bracket 10, and to prevent turning over said washer. Said washer will, of course, have sufficient diameter to span the slot 11 in the bracket 10. The spring washer 16 is preferably provided in encircling relationship with the shank 21 within the recessed portion of the washer 15 centrally of the annular bead 24. Said nut 17 preferably takes the form of a frustum of a cone indicated by the numeral 25 and a head portion 26 of hexagonal or other non-round contour. The frustum of a cone 25 is internally threaded for cooperation with the threaded shank 21. The head 26 has a central aperture of a diameter greater than the diameter of the shank 21. Said frustum of a cone 25 and said hexagonal head portion 26 provide between them a weakened portion 27 whereby the hexagonal head portion may be readily sheared off by the application of additional turning force after the nut 17 has been turned home.

The mode of operation of the above described embodiment of the invention will be clear without detailed explanation. It may be explained briefly, however, that when the device is to be used in the holding of a license plate upon the usual form of supporting bracket, the shank 21 will be inserted through the slot 13 of the license plate and through the slot 11 of the bracket 10. It is understood, of course, that a license plate will ordinarily have slots adjacent to its two ends, and that two of the above described embodiments of the present invention will be utilized in connection with a single license plate. With the shank 21 in position within the slots 13 and 11, as above mentioned, the washer 15 will be mounted upon the shank 21, the fingers 24a—24a thereof being positioned within the slot 11 of the bracket 10. The wings 23—23 of the shank 21 will prevent turning of the head portion 14 within the slots 13 and 11. In the event that the license plate has a round hole instead of a slot, said wings 23—23 will dig into the metal of the license plate, and will thereby be prevented from turning.

After the washer 15 has been located upon the shank 21, the spring washer 16 will be mounted in position and the nut 17 will be turned home. By reason of the weakened portion 27 inwardly of the hexagonal head portion 26, said hexagonal head portion 26 may be readily sheared off by the application of a reasonable additional turning force. Under the conditions referred to, there will be little or nothing for a thief to grip for the purpose of backing off the nut 17.

When it is desired to change license plates, the frustum of the cone 25 comprising what is left of the nut 17 may be backed off by applying force to the periphery thereof in an approximately tangential direction as, for example, by means of a chisel and hammer. Though of course a thief could remove the portion 25 of the nut 17 by this expedient, experience has shown that a sneak thief will not ordinarily go to this trouble for the purpose of stealing a license plate.

The present invention, therefore, provides a simple, inexpensive and effective device for foiling the sneak thief who might otherwise be tempted to steal license plates, but does not present insurmountable difficulties to one authorized to remove said license plates.

Though a preferred embodiment of the present invention has been described in detail, many modifications will occur to those skilled in the art. It is intended to cover all such modifications which fall within the scope of the appended claims.

I claim:

1. In an anti-theft device, in combination, a threaded shank having a headed portion secured thereto, said shank having wings extending diametrically therefrom, a washer adapted to be disposed upon said shank, said washer having fingers extending longitudinally therefrom at diametrically opposite positions, and a nut adapted to be threaded upon said shank, said nut including a smooth peripheral portion having a threaded central aperture and a non-round head portion having a central aperture of a diameter greater than the diameter of said shank, said smooth peripheral portion and said headed portion having a weakened portion interposed therebetween.

2. In an anti-theft device, in combination, a threaded shank having a head portion secured thereto, said shank having wings extending diametrically therefrom, a washer adapted to be disposed upon said shank, said washer having fingers extending longitudinally therefrom at diametrically opposite positions, and a nut adapted to be threaded upon said shank, said nut including a smooth peripheral portion having a threaded central aperture and a non-round head portion having a central aperture of a diameter greater than the diameter of said shank, said smooth peripheral portion and said headed portion having a weakened portion interposed therebetween, said wings tapering toward the threaded portion of said shank.

3. In an anti-theft device, in combination, a threaded shank having a headed portion secured thereto, said shank having wings extending diametrically therefrom, a washer adapted to be disposed upon said shank, said washer having fingers extending longitudinally therefrom at diametrically opposite positions, and a nut adapted to be threaded upon said shank, said nut including a smooth peripheral portion having a threaded central aperture and a flat sided head portion having a central aperture of a diameter greater than the diameter of said shank, said smooth peripheral portion and said headed portion having a weakened portion interposed therebetween.

4. In an anti-theft device, in combination, a threaded shank having a headed portion secured thereto, said shank having wings extending diametrically therefrom, a washer adapted to be disposed upon said shank, said washer having fingers longitudinally extending therefrom at diametrically opposite positions, and a nut adapted to be threaded upon said shank, said nut including a smooth peripheral portion having a threaded central aperture and a non-round head portion having a central aperture of a diameter greater than the diameter of said shank, said smooth peripheral portion and said headed portion having a weakened portion interposed therebetween, said washer being ribbed annularly to provide a central recess for receiving said nut.

5. In an anti-theft device, in combination, a threaded shank having a headed portion secured thereto, said shank having wings extending diametrically therefrom, a washer adapted to be disposed upon said shank, said washer having fingers longitudinally extending therefrom at diametrically opposite positions, and a nut adapted to be threaded upon said shank, said nut including a smooth peripheral portion having a threaded central aperture and a non-round head portion having a central aperture of a diameter greater than the diameter of said shank, said smooth peripheral portion and said headed portion having a weakened portion interposed therebetween, said washer being ribbed annularly to provide a central recess for receiving said nut, said wings tapering toward the threaded portion of said shank.

6. In an anti-theft device, in combination, a threaded shank having a headed portion secured thereto, said shank having wings extending diametrically therefrom, a washer adapted to be disposed upon said shank, said washer having fingers longitudinally extending therefrom at diametrically opposite positions, and a nut adapted to be threaded upon said shank, said nut including a smooth peripheral portion having a threaded central aperture and a flat sided head portion having a central aperture of a diameter greater than the diameter of said shank, said smooth peripheral portion and said headed portion having a weakened portion interposed therebetween, said washer being ribbed annularly to provide a central recess for receiving said nut.

7. In an anti-theft device, in combination, a threaded shank having a headed portion, a cupped member disposed upon said headed portion, said shank having swedged out portions for holding said cupped member in engagement with said headed portion, said shank having diametrically opposed wings extending therefrom, a washer adapted to be mounted upon said shank, said washer having diametrically opposed fingers adapted to be positioned within a slot of a license bracket, and a nut for holding said washer in position upon said shank, said nut including a smooth peripheral portion having a threaded central aperture and a non-round headed portion having a central aperture of a diameter greater than the diameter of said shank, said peripheral portion and said headed portion being separated by a weakened portion.

8. In an anti-theft device, in combination, a threaded shank having a headed portion, a cupped member disposed upon said headed portion, said shank having swedged out portions for holding said cupped member in engagement with said headed portion, said shank having diametrically opposed wings extending therefrom, and a nut upon said shank, said nut including a smooth peripheral portion having a threaded central aperture and a non-round headed portion having a central aperture of a diameter greater than the diameter of said shank, said peripheral portion and said headed portion being separated by a weakened portion.

9. In an anti-theft device, in combination, a threaded shank having a headed portion, a cupped member disposed upon said headed portion, said shank having swedged out portions for holding said cupped member in engagement with said headed portion, said shank having diametrically opposed wings extending therefrom, a washer adapted to be mounted upon said shank, said washer having diametrically opposed fingers adapted to be positioned within a slot of a license bracket, and a nut for holding said washer in position upon said shank, said nut including a smooth peripheral portion having a threaded central aperture and a non-round headed portion having a central aperture of a diameter greater than the diameter of said shank, said peripheral portion and said headed portion being separated by a weakened portion, said cup-shaped member being disposed in non-rotatable relationship with said shank by engagement with said wings.

10. In an anti-theft device, in combination, a threaded shank having a headed portion, a cupped member disposed upon said headed portion, said shank having swedged out portions for holding said cupped member in engagement with said headed portion, said shank having diametrically opposed wings extending therefrom, and a nut upon said shank, said nut including a smooth peripheral portion having a threaded central aperture and a non-round headed portion having a central aperture of a diameter greater than the diameter of said shank, said peripheral portion and said headed portion being separated by a weakened portion, said cup-shaped member being disposed in non-rotatable relationship with said shank by engagement with said wings.

11. In combination, a license supporting bracket, a license plate, said bracket and said license plate having slots adapted to be superposed, an anti-theft device for securing said license plate to said bracket, said anti-theft device including a threaded shank having a head, said head having a greater diameter than the slot in said license plate, said shank having diametrically opposed wings adapted to lie in said slots in said plate and said bracket to prevent turning of said head relative to said plate and said bracket, and means including a nut adapted to engage against the opposite side of said bracket, said nut including a smooth peripheral portion having a threaded central aperture and a non-round headed portion having a central aperture of a diameter greater than the diameter of said shank, said peripheral portion and said headed portion being separated by a weakened portion, said means including a washer having diametrically opposed fingers adapted to engage within said slot in said bracket.

HARRY F. GEORGE.